Figure 1:
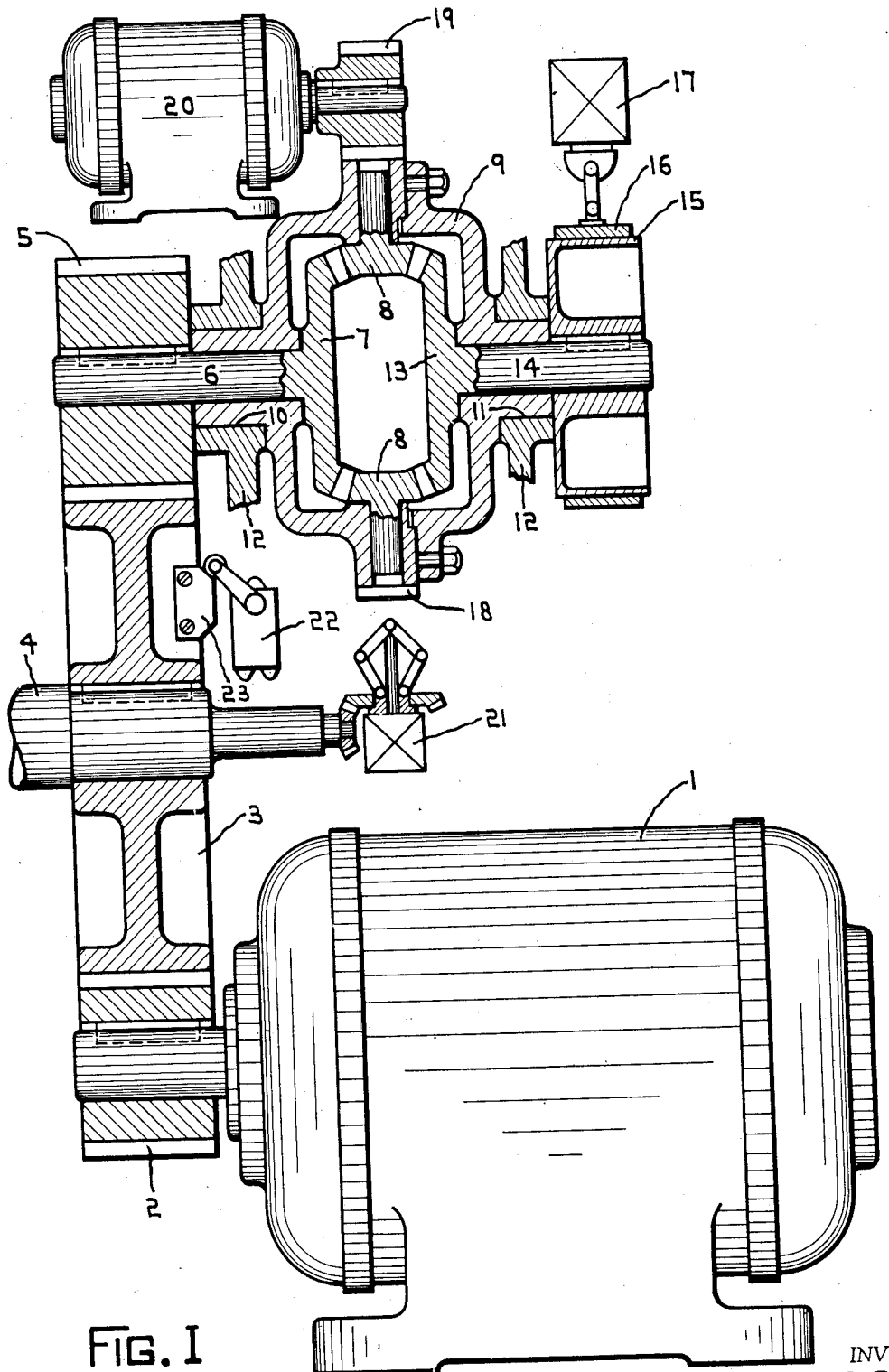

Oct. 5, 1943.  W. R. MEYER  2,330,985

SPINDLE CONTROL MECHANISM

Filed Sept. 28, 1942

INVENTOR.
WALTER R. MEYER
BY Willard S. Groene
ATTORNEY

Patented Oct. 5, 1943

2,330,985

UNITED STATES PATENT OFFICE 2,330,985

SPINDLE CONTROL MECHANISM

Walter R. Meyer, Cincinnati, Ohio, assignor to The R. K. Le Blond Machine Tool Company, Cincinnati, Ohio, a corporation of Delaware Application September 28, 1942, Serial No. 459,921

5 Claims. (Cl. 192—139)

This invention pertains to spindle control mechanism for machine tools and is more particularly related to the stopping of rotating work spindles at the completion of a cutting cycle in a predetermined position. It is one of the basic objects of this invention to provide an arrangement for rapidly stopping the rotation of a work spindle in an accurate position of circumferential location and to accomplish this result with a smoothness of operation and accuracy of stop position to permit loading and unloading work pieces on the work spindle. In some instances it is desirable to accomplish such spindle stopping with a very high degree of accuracy in order to orient a work piece and a work spindle in proper relationship when inserting work or removing the work from the work spindle, as in many cases work gripping devices are provided on the work spindle which must engage the work piece in a particular position and location on the work piece. Such an arrangement for example is especially well adapted for the stopping of work spindles in crankshaft lathes, such as center drive crankshaft lathes, where the work must be inserted into the center drive chucking mechanism in the center drive work spindle in a predetermined position so that the work gripping members of the chuck may properly align themselves and grip premachined locating surfaces on the crankshaft to be machined.

The general mode of operation of this device is to provide a main driving motor for rotating a work spindle or other like member at an operating speed necessary to perform machining or cutting operations. After the completion of the cutting operation, effected by operation of the main drive motor for the machine tool work spindle, the main drive motor is then de-energized and appropriate differential apparatus becomes effective to promptly slow down the momentum of the work spindle and the main driving motor to a predetermined slow speed, and then to continue operating said work spindle and main driving motor at said predetermined slow speed, and then finally effecting a total and complete accurate stopping of the work spindle and driving motor at a predetermined position. This arrangement, incorporating differential transmission gearing, a friction brake associated with said differential transmission, and a slow speed driving motor for slowly rotating the main drive motor (when electric power is disconnected therefrom), and the work spindle at a predetermined slow speed and appropriate control switches and mechanisms, effects the above cycle of operation.

Further features and advantages of this invention will appear from a detailed description of the drawing in which:

Figure I shows a diagrammatic layout of the spindle control mechanism and main driving motor apparatus for actuating an output shaft for driving a work spindle of a machine tool.

Referring to the Figure I, the main driving motor 1 for actuating the work spindle to effect the cutting operation has a suitable driving pinion 2 which drives a gear 3 carried on the output shaft 4 which is appropriately connected to a work spindle to rotate and drive it. Connected in driving relationship with the gear 3 is a pinion 5 which is fixed on a shaft 6 containing a bevel gear 7, and which bevel gear 7 is in driving engagement with bevel pinions 8 carried in a differential housing 9 appropriately journaled on bearings 10 and 11 in a suitable mounting frame 12 of the machine tool. These pinions 8 in turn engage a bevel gear 13 on the brake shaft 14 on the outer end of which is a brake drum 15 which is contacted by a suitable brake shoe 16 operated by a solenoid 17. On the differential housing 9 is formed a gear 18 which is in mesh with a pinion 19 of the slow speed driving motor 20.

During the normal operation of the machine in the cutting cycle the main drive motor is being supplied with power to rotate the pinion 2 and gear 3 to deliver driving power to the output shaft 4 connected to a work spindle of the machine tool. As soon as the cutting operation has been completed and the tools are to be retracted away from the work, power is cut off from the main drive motor 1 and the solenoid 17 simultaneously energized so as to apply the brake shoe 16 to the brake drum 15 arresting rotation of the shaft 14 of the differential driving mechanism. As a result of braking the shaft 14, the inertia and stored up momentum in the main drive motor (which is now de-energized) and transmission mechanism from the work spindle to the shaft 4 is transmitted to the pinion 5 and the shaft 6 and through the bevel gear 7 to the pinions 8 of the differential housing 9. Now since the shaft 14 is locked against rotation the result will be that the pinions 8 will be caused to rotate around on the bevel gear 13 and will drive the differential housing likewise around which will cause its gear 18 to rotate the pinion 19 and the armature of the motor 20. As a result of this gear ratio of two to one between the input shaft 6 and the differential housing 9 and a considerable ratio, (as indicated on the drawing of about five-to-one between the gears 18 and 19), there will be an automatic speed reducing action caused by this speedup drive through the shaft 6 to speed up rotation of the armature of the motor 20. As a result, the main drive motor 1 and associated work spindle will be rapidly and smoothly brought down to a relatively slow speed, at which time the motor 20 is energized by the action of the centrifugal switch 21 carried on the shaft 4 so that when the shaft 4 is brought down to a predetermined slow speed this centrifugal switch 21 will close and cause power to be applied to the motor 20. With power thus applied to the motor 20 and due to the large gear ratio between the gears 19 and 18 and to the differential carrier having the pinions 8 engaging the gear 7 the motor 20 will slowly rotate the shaft 6 since at this time the shaft 14 is still locked by the solenoid brake 17. After the spindle is being rotated at this predetermined slow speed the limit switch 22 becomes effective so that the first time the dog 23 on the gear 3 rotates around to operate the limit switch 22 (after the shaft 4 through the medium of centrifugal switch 21 has reached the predetermined slow speed) immediately operates the solenoid brake 17 to release brake shoe 16 from the drum 15, permitting the shaft 14 free rotation. As a result of the instantaneous release of the brake 16 the shaft 6 will instantly stop with no jar or coasting action even though the motor 20 continues to operate. Thus under these conditions, the driving power from the motor 20 will then extend itself in the free rotation of the shaft 14 and the drum 15 and will not tend to rotate the "speed-up" or "harder" drive of the main drive motor 1, the shaft 4, and its associated work spindle. As a result of this arrangement of having the brake 16 released to effect the accurate stopping, no uncertain frictional problem is involved and no problem of coasting is involved with respect to the motor 1 and its associated spindle driving mechanism since they are rotating at a slow speed by the motor 20. Thus in this arrangement is provided means for rapidly and smoothly slowing down a work spindle driving transmission mechanism without sliding friction, rotating the transmission for a short period at a predetermined slow speed, and then effecting an instant stopping of said transmission at a predetermined position without relying on frictional or other means of like character to effect the final ultimate accurate stopping of the main driving motor and associated work spindle.

Having thus fully set forth and described my invention what I claim as new and desire to secure by United States Letters Patent is:

1. In a machine tool having a rotatable work spindle, means for rotating said work spindle, differential transmission gearing comprising a differential housing rotatable by a second driving means at a predetermined slow speed, bevel pinions journaled in said housing, a bevel gear engaging said bevel pinions and connected to said work spindle, a second bevel gear engaging said pinions and connected to a brake, and means whereby actuation of said brake to arrest rotation of said second mentioned bevel gear, when said first mentioned driving means for said work spindle is rendered inoperative, will cause slowing down of said work spindle to a predetermined slow speed.

2. In a machine tool having a rotatable work spindle, means for rotating said work spindle, differential transmission gearing comprising a differential housing rotatable by a second driving means at a predetermined slow speed, bevel pinions journaled in said housing, a bevel gear engaging said bevel pinions and connected to said work spindle, a second bevel gear engaging said pinions and connected to a brake, and means whereby actuation of said brake to arrest rotation of said second mentioned bevel gear, when said first mentioned driving means for said work spindle is rendered inoperative, will cause slowing down of said work spindle to a predetermined slow speed, and means whereby release of said brake will cause said work spindle to stop.

3. In a spindle control mechanism, a main drive motor for rotating said spindle, means for connecting said main drive motor to said spindle, a differential transmission associated with said work spindle and said main drive motor comprising a differential housing journaled on the machine frame having said work spindle, a second slow speed driving motor connected to rotate said housing, bevel pinions in said housing, a bevel gear having a shaft connected to the connecting means between said main drive motor and said work spindle, a second bevel gear in driving engagement with said pinions having a shaft carrying a brake drum, solenoid means for applying or disengaging a brake shoe on said brake drum so as to arrest rotation or permit free rotation of said second mentioned bevel gear and shaft, said second mentioned driving motor being effective to rotate said work spindle at a predetermined slow speed when said solenoid brake is rendered operative to restrict rotation of said second mentioned bevel gear and shaft, and means whereby said slow speed motor, when driving said main drive motor when de-energized and said work spindle at a predetermined slow speed, is rendered ineffective and further rotation of said spindle instantly ceases by disengaging said solenoid braking device.

4. In a spindle control mechanism, a main drive motor for rotating said spindle, means for connecting said main drive motor to said spindle, a differential transmission associated with said work spindle and said main drive motor comprising a differential housing journaled on the machine frame having said work spindle, a second slow speed driving motor connected to rotate said housing, bevel pinions in said housing, a bevel gear having a shaft connected to the connecting means between said main drive motor and said work spindle, a second bevel gear in driving engagement with said pinions having a shaft carrying a brake drum, solenoid means for applying or disengaging a brake shoe on said brake drum so as to arrest rotation or permit free rotation of said second mentioned bevel gear and shaft, said second mentioned driving motor being effective to rotate said work spindle at a predetermined slow speed when said solenoid brake is rendered operative to restrict rotation of said second mentioned bevel gear and shaft, and means whereby said slow speed motor, when driving said main drive motor when de-energized and said work spindle at a predetermined slow speed, is rendered ineffective and further rotation of said spindle instantly ceases by disengaging said solenoid braking device, and means whereby engagement of said solenoid brake simultaneously with the de-energizing of said main drive motor causes slowing down of said main drive motor and associated transmission connected to said work spindle, by the inertia required to speed up said second mentioned slow speed driving motor.

5. In a spindle control mechanism, a prime mover for rotating said work spindle, a second motive means, for rotating said work spindle at a predetermined slow speed, connected to said work spindle to rotate therewith, a brake associated with said second motive means, means whereby the simultaneous de-energizing of said prime mover and engagement of said brake causes acceleration of said second motive means so as to slow down rotation of said work spindle, means whereby continued application of said brake and energizing of said second motive means causes said work spindle and prime mover to be continuously rotated at a predetermined slow speed, and means whereby disengagement of said brake under said last mentioned condition results in substantially instantaneous stopping of said main drive motor and work spindle.

WALTER R. MEYER.